United States Patent
Hsu et al.

(10) Patent No.: US 7,254,562 B2
(45) Date of Patent: Aug. 7, 2007

(54) RULE-BASED PACKET SELECTION, STORAGE, AND ACCESS METHOD AND SYSTEM

(75) Inventors: Wan-Yen Hsu, Cupertino, CA (US); Eric C. Scoredos, Boulder Creek, CA (US); Nobuhisa Takahashi, Kobe (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 408 days.

(21) Appl. No.: 10/192,948

(22) Filed: Jul. 11, 2002

(65) Prior Publication Data

US 2004/0010473 A1 Jan. 15, 2004

(51) Int. Cl.
*G06Q 99/00* (2006.01)

(52) U.S. Cl. .............. 705/77; 705/57; 705/58

(58) Field of Classification Search .......... 705/77, 705/57, 58
See application file for complete search history.

(56) References Cited

U.S. PATENT DOCUMENTS

| 4,067,649 | A | * | 1/1978 | Hubbard et al. | 399/85 |
| 5,699,362 | A | * | 12/1997 | Makam | 370/437 |
| 5,734,654 | A | * | 3/1998 | Shirai et al. | 370/396 |
| 5,835,726 | A | * | 11/1998 | Shwed et al. | 709/229 |
| 5,918,073 | A | * | 6/1999 | Hewitt | 710/52 |
| 2006/0184454 | A1 | * | 8/2006 | Ananda | 705/57 |

FOREIGN PATENT DOCUMENTS

JP         02004140634 A  *  5/2004

* cited by examiner

Primary Examiner—Pierre Eddy Elisca

(57) ABSTRACT

A rule-based selection, storage and access method and system for processing packets from network traffic. First, packet intercepted from network traffic are selected based on at least one rule. Second, the selected packets are stored in an in-kernel storage buffer, which can be tuned to a size that is appropriate to the number packets being captured and the ability of a packet usage application (e.g., a billing program) to process the packets. Third, an access mechanism is provided to a packet usage application for accessing the stored packets. The intercepted network traffic is provided to a receiving application.

28 Claims, 9 Drawing Sheets

RULE-BASED PACKET SELECTION, STORAGE, AND ACCESS METHOD AND SYSTEM

FIELD OF THE INVENTION

The present invention relates generally to determining network usage, and more particularly, to a method and system for selecting packets from network traffic based on one or more rules, storing the selected packets, and providing an interface for accessing the stored packets by an application (e.g., a pay-per-use billing application for network access).

BACKGROUND OF THE INVENTION

Internet Service Providers (ISPs) have three basic models for charging customers for providing access to the Internet. The first model charges a flat monthly fee for "unlimited" usage (also referred to as a flat-fee business model). This model is commonly employed by ISPs, such as America On Line (AOL) and Earthlink, to charge for their dial-up connection services.

In the second model, a customer is charged by connect time. Wireless carriers or wireless ISPs, especially in Europe and Asia, commonly use this model. However, the connect time is impacted by network load and network speed, which are not under a customer's control. For example, when the network is congested, the network speed decreases, and it would take much longer, for example, for the customer to transfer a file than when the network is less busy. In this regard, customers are being penalized for a congested network since the customer is charged solely based on connect time and not on the amount of data transferred or actual usage of the network. However, many customers would rather pay for the actual services received instead of paying for the connect time. Consequently, this billing model may not be attractive to customers.

A third model charges a customer based on usage of the network (also referred to as a pay-per-use business model). For example, the third model charges a customer based on the number of packets that are received or sent through the ISP network. Both the customer and the ISP may prefer the third model. From the customer's point of view, one benefit is that the customer pays only for the usage of the network. In this manner, the cost for use of the network is more fairly allocated to the users, where those users that heavily use the network pay a greater fee, and those users that use the network less, pay a smaller fee. From the ISP's point of view, one benefit is that the ISP can use the pay-per-use business model to more efficiently allocate bandwidth and resources.

Unfortunately, although the pay-per-use business model is intuitive to understand, the pay-per-use business model is difficult to implement. Specifically, the implementation of the pay-per-use business model poses difficult technical problems. One of these problems or challenges is called the producer-consumer problem. The producer-consumer problem exists when the number of packets generated exceeds the number of packets that can be consumed or processed.

When billing a customer with a pay-per-use model, the number of packets that are sent or received by the customer must be calculated. However, as can be appreciated, there may be many thousands of packets that are received from the network every minute. In this regard, the network must both deliver the packets to the end-user and process the packets to bill the end-user's account. It is desirable that the processing required for maintaining an end-user's account not affect network performance. Furthermore, it is desirable that the processing for the user account not drop packets in the event that the accounting process is unable to keep up with the network packet flow. Otherwise, when packets are dropped, the user is improperly billed for his/her usage.

For example, using current technology, it is predicted that 20% or more of the packets that are received from the network will be lost or dropped while trying to process the packets for accounting purposes. Any packet loss would not be acceptable for an application that bills a customer based on the usage or amount of traffic. Accordingly, a mechanism for counting packets that has a zero packet loss would be desirable.

Based on the foregoing, there remains a need for a method and system for metering packets in a network that has zero packet loss and that overcomes the disadvantages of the prior art as set forth previously.

SUMMARY OF THE INVENTION

According to one embodiment of the present invention, a rule-based packet selection, storage, and access mechanism (PSSAM) is described. The mechanism selects packets from network traffic based on one or more rules, stores the selected packets, and provides an interface for accessing the stored packets by an application (e.g., a pay-per-use billing application for network access).

According to another embodiment of the present invention, a method for selecting packets from network traffic based on at least one rule (e.g., a set of rules) is described. First, network traffic is intercepted. Second, packets from the network traffic are selected based on at least one rule and a copy of the selected packets is stored in an in-kernel storage buffer. Third, the stored packets are accessed through a data transfer mechanism that provides an interface between the in-kernel storage buffer and applications that require the selected packets (e.g., a packet usage application or a pay-per-use billing application). A network billing application can then access the intercepted network traffic and analyze them to correctly bill a user for the user's network usage. All network traffic is then passed onto the transport stack in order to deliver the packets to the receiving applications (e.g., an e-mail application). The receiving application can either reside locally on the same system or remotely on a separate system.

According to another embodiment of the invention, a system for selectively storing packets from network traffic based on at least one rule is described. The system includes a rule-based packet selection mechanism for selectively storing packets from network traffic based on at least one rule in an in-kernel storage buffer. The system also includes a kernel space to user space data transfer mechanism for providing an interface for use by a packet usage application to retrieve the stored packets from the in-kernel storage buffer. A configuration parameter tuning utility may be provided for providing statistical information about the kernel. The statistical information can be employed by a user to adjust at least one configuration parameter (e.g., size of the in-kernel storage buffer and size of the user-space storage buffer) in order to accommodate the load requirements of the network and accommodate the requirements of the packet usage application without packet loss.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
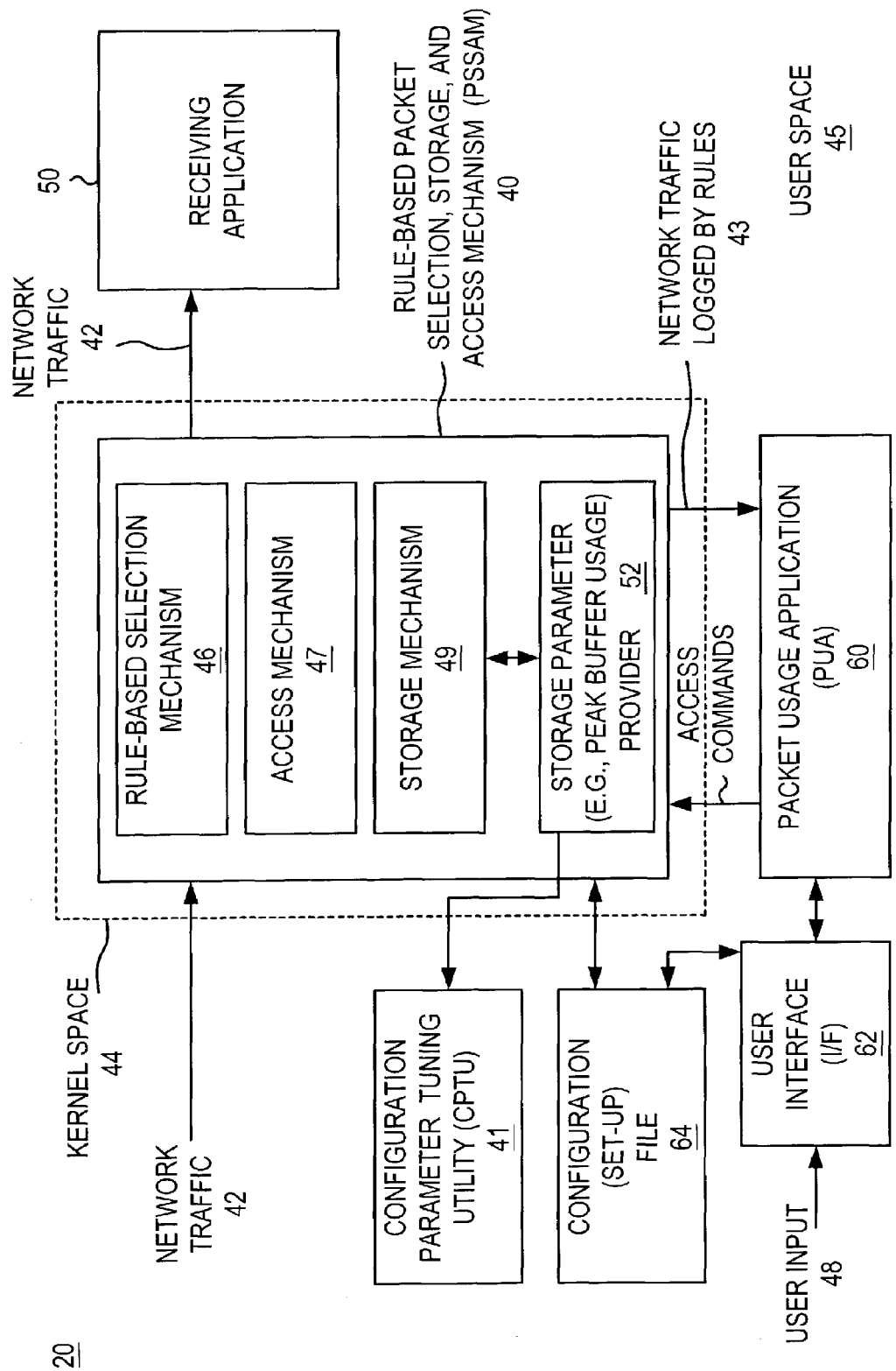
FIG. 1 illustrates a system in which the rule-based packet selection, storage, access mechanism (PSSAM) according to one embodiment of the present invention can be implemented.

A rule-based packet selection, storage, and access method and system for enabling a pay-per-use business model for network access (e.g., network connection services of an Internet Service Provider). In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The system and method for metering packets can be implemented in hardware, software, firmware, or a combination thereof. In one embodiment, the invention is implemented using software that is executed by general purpose or an application specific processor.

In an alternative implementation, embodiments of the invention may be implemented using a combination of hardware and software that is stored in a memory and that is executed by a suitable instruction execution system.

The hardware portion of the invention can be implemented with one or more of the following well-known technologies: discrete logic circuits that include logic gates for implementing logic functions upon data signals, application specific integrated circuit (ASIC), a programmable gate array(s) (PGA), and a field-programmable gate array (PPGA).

The software portion of the invention can be stored in one or more memory elements and executed by a suitable general purpose or application specific processor. The program for metering packets, which comprises an ordered listing of executable instructions for implementing logical functions, can be embodied in any computer-readable medium for use by or in connection with an instruction execution system or apparatus (e.g., a computer-based system, a processor-based system, or other system that can fetch and execute the instructions).

As used herein the term "computer-readable medium" can be any means that can contain, store, communicate, propagate, or transport the program for use by or in connection with the instruction execution system or apparatus. The computer readable medium can be, for example, but is not limited to, an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It is noted that the computer-readable medium can even be paper or another suitable medium upon which the program is printed. The program can be electronically captured (e.g., through optical scanning) from the paper or medium, compiled, interpreted or otherwise processed in a suitable manner if necessary, and then stored in a computer memory.

It is further noted that aspects of the present invention are described in connection with packets that conform to the Internet Engineering Task Force (IETF) Transmission Control Protocol/Internet Protocol (TCP/IP) (RFCs 792 & 793). However, it is to be appreciated that the teachings of the present invention extend to packets that conform to different formats and protocols.

System 20

FIG. 1 illustrates a system 20 in which the rule-based packet selection, storage, access mechanism (PSSAM) 40 according to one embodiment of the present invention can be implemented. The mechanisms according to the invention accurately count or meter packets (i.e., with no packet loss) so as to enable a pay-per-use business model for network access. These mechanisms that are described hereinafter are referred to collectively as IPMeter module. Those mechanisms that reside in kernel space 44 are referred to as the rule-based packet selection, storage, access mechanism (PSSAM) 40. The components of the IPMeter module that are implemented in user space 45 are described in greater detail hereinafter with reference to FIGS. 7-10.

The system 20 includes the rule-based packet selection, storage, access mechanism (PSSAM) 40 according to the invention, a receiving application 50, and a packet usage application 60 (e.g., a pay-per-use packet metering application). The packet usage application 60 is also referred to herein as a user application.

A packet usage application 60 utilizes the intercepted packets for a statistical purpose (e.g., measuring packet usage, billing purposes, or determining network congestion). The receiving application 50 receives the packets from the (PSSAM) 40 and employs the packets for a particular purpose. For example, the receiving application 50 can be an electronic mail application, such as Microsoft Outlook, that receives the mail and displays the mail to an end user, or a web browser, such as Microsoft Explorer, that receives a web page and displays the HTML page to the user.

The rule-based packet selection, storage, access mechanism (PSSAM) 40 includes a first input for intercepting network traffic 42. The rule-based packet selection, storage, access mechanism (PSSAM) 40 also includes a first output for providing the network traffic 42 to the receiving application 50. The receiving application 50, which may be local to system 20 or remote from the system 20, receives the network traffic 42. It is noted that the PSSAM 40 according to the invention may be disposed in a Gateway System that forwards traffic after converting from a wireless to a normal TCP stack, for example. The rule-based packet selection, storage, access mechanism (PSSAM) 40 also includes a second output for duplicating the network traffic logged by rules to the packet usage application 60.

The rule-based packet selection, storage, access mechanism (PSSAM) 40 generates network traffic logged by at least one rule 43. The rule-based packet selection, storage, access mechanism (PSSAM) 40 includes one or more rules. Each of the rules specifies one or more criterion by which the network traffic 42 is selected. These rules are defined, specified, or configured by user input 48 and may be stored in a configuration file 64. New rules may be added, and existing rules may be updated or deleted, or otherwise modified.

The rule-based packet selection, storage, access mechanism (PSSAM) 40 includes 1) a rule-based selection mechanism 46 for selecting packets intercepted from traffic (e.g., incoming network traffic of a server) based on at least one rule; 2) a storage mechanism 49 for storing a copy of the selected packets in an in-kernel memory buffer; 3) an access mechanism 47, which is hereinafter also referred to as a data transfer mechanism, for providing an interface for use by an application to access the stored packets, and 4) a storage parameter provider 52 for providing one or more parameters (e.g., peak in-kernel buffer usage) related to the kernel space 44.

The system 20 also includes a configuration parameter tuning utility (CPTU) 41 for receiving the output of the storage parameter provider 52 and providing a user interface for enabling a user to retrieve the storage parameter (e.g., the peak in-kernel buffer usage). As described in greater detail hereinafter, the storage parameter can be used by an administrator as a guide to efficiently configure one or more configuration parameters of the system 20.

The operation of the rule-based packet selection, storage, access mechanism (PSSAM) 40 is described in greater detail hereinafter with reference to FIG. 3 and FIG. 4. The rule-based selection mechanism 46 and storage mechanism 49 are described in greater detail hereinafter with reference to FIGS. 3, 4, and 6. The data transfer mechanism 47 is described in greater detail hereinafter with reference to FIGS. 7-8. The configuration parameter tuning utility (CPTU) 41 is described in greater detail hereinafter with reference to FIGS. 5 and 8.

Network traffic 42 includes packets of information. Each packet is typically divided into a plurality of fields, whose function is defined by a predetermined protocol. The rules can compare, for example, one or more fields in an incoming packet with predetermined values and select that packet for logging if the appropriate values are present.

One rule that the user can specify is to intercept only those packets that come from a particular network card. For example, a server may have multiple network cards, each of which provides a stream of network traffic. Network card selection rules enable the output traffic stream to be limited to those packets that come from, for example, a first network card. A user can configure the network card selection rules to capture only packets that come from a particular network card or a group of network cards. A PSSAM administrator can further specify that only packets coming from a specific network card with a specific destination port should be logged for billing purposes. For example, only Simple Mail Transport Protocol (SMTP) packets, which are normally configured with a destination port of 25, from a LAN network card (e.g., the lan0 card) are logged or copied.

TCP/IP Model

Figure 2:
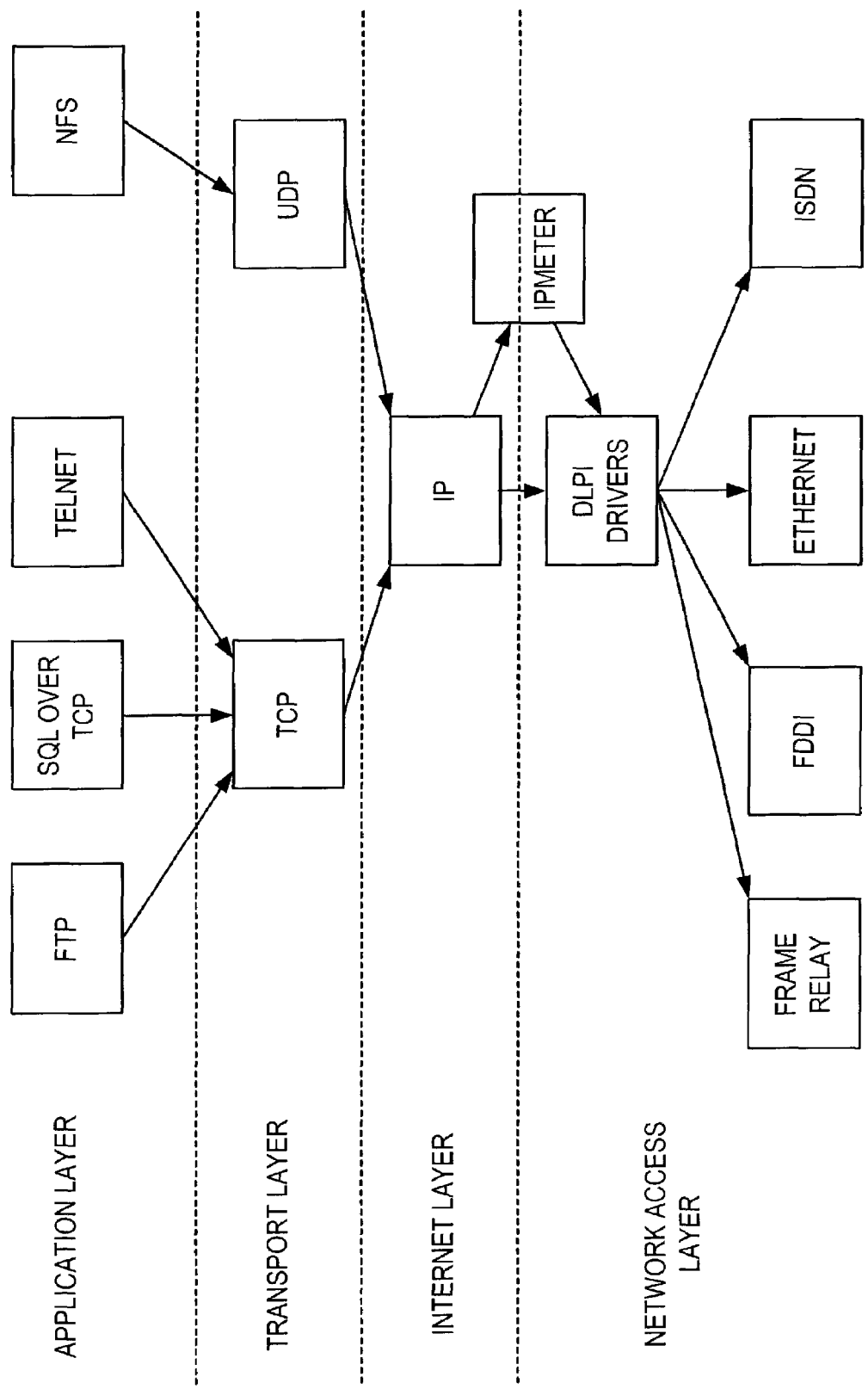
FIG. 2 illustrates a TCP/IP model in which the rule-based packet selection, storage, access mechanism (PSSAM) in accordance with one embodiment of the present invention may be implemented.

FIG. 2 illustrates a TCP/IP model in which the rule-based packet selection, storage, access mechanism (PSSAM) in accordance with one embodiment of the present invention may be implemented. The TCP/IP model includes an application layer, a transport layer, an Internet layer, and a network access layer. The application layer can include applications, such as file transfer protocol (FTP), SQL over TCP, Telnet, and NFS. The transport layer can include protocols such as Transmission Control Protocol (TCP) and User Datagram Protocol (UDP).

The Internet layer includes the Internet Protocol (IP) that determines the route from the source to the destination computer. The Internet layer employs the IP to identify the end-systems in the Internet (also referred to as a logical address), such as an IP address or host name. The IP is responsible for putting source and destination IP addresses in a packet and for sending the packet to its destination.

The network access layer is responsible for placing frames of data onto the network and taking data off the network via a network adapter card. The network access layer can include Ethernet, FDDI, Frame Relay, ISDN. A data link programming interface (DLPI) driver communicates between the IP module and the network access layer. The mechanisms according to the invention that reside in kernel space (which are collectively referred to as an IP Meter Module) may be disposed between the IP module and the DLPI driver according to the invention.

It is noted that the IP Meter kernel module is below the TCP and IP layers so that re-transmissions due to packet errors or router congestion can be detected. Based on its policy, an ISP can then decide whether to charge its end-user for the retransmission of packets.

Billing programs that use sockets or other user-space APIs that read the network packets above the transport layer cannot detect retransmissions, because TCP guaranteed message delivery solves problems in the networks delivery of the data stream. They accurately reflect the actual network traffic necessary to successfully deliver the user's transactions. However, the retransmission packets are invisible to layers above TCP, and thus cannot be captured by the usage meter mechanism above the TCP/IP layer.

The memory for the system is divided into kernel space 44 and user space 45. The kernel space 44 as used herein refers to a predetermined address space in memory that is reserved for operating system programs. The term "kernel" is often used to refer to those important operating system programs (e.g., programs that manage files, programs that manage networking, and programs that manages virtual memory). The programs resident in the kernel space 44 have a higher priority to resources than programs resident in the user space 45.

According to one embodiment of the invention, the IP Meter is a low overhead mechanism for capturing headers of IP packets from network traffic for IP usage metering purpose. This mechanism intercepts network traffic below the IP layer in the operating system (OS), extracts the packet headers, and logs them to a kernel memory buffer. The IP Meter also provides optimized user code for an application to efficiently retrieve packet headers from the kernel memory buffer. As a result, the mechanism according to the invention achieves zero packet loss with a low CPU and network throughput overhead at high network traffic loads (e.g., 100 to 200 Megabits/s network load).

The IP Meter, according to the invention, is much more efficient, as compared to prior art approaches. For example, one prior art approach employs a user space program called TCPDUMP. TCPDUMP creates a copy of each IP packet the system receives. When compared in the same network environment to one embodiment of the invention, the prior art approach incurred a 20% packet loss at a similar network load.

Packet Selection, Storage, Access Mechanism (PSSAM) 40

Figure 3:
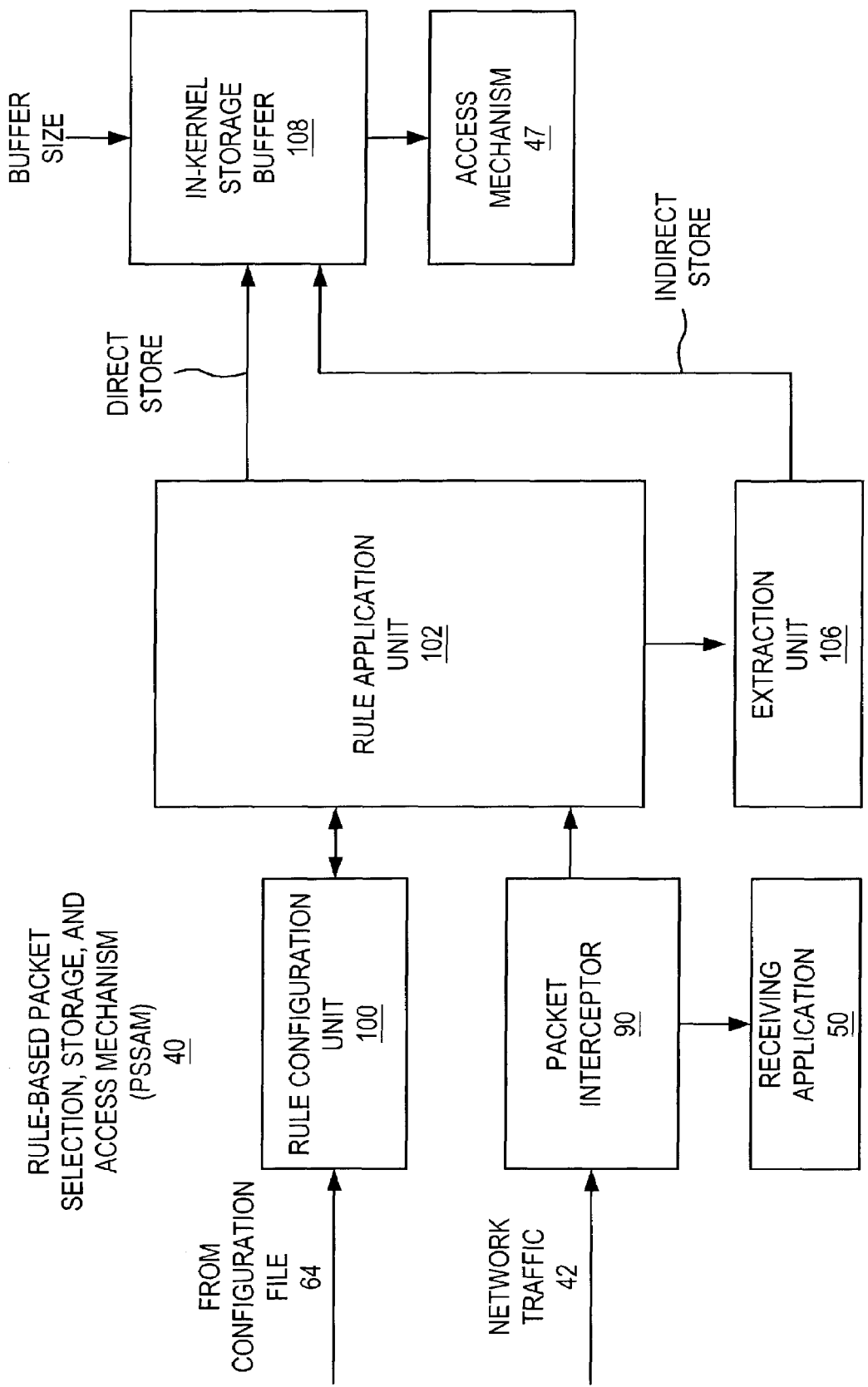
FIG. 3 is a block diagram illustrating in greater detail the rule-based packet selection, storage, access mechanism (PSSAM) of FIG. 1.

FIG. 3 is a block diagram illustrating in greater detail the rule-based packet selection, storage, access mechanism (PSSAM) 40 of FIG. 1 according to one embodiment of the invention. In this embodiment, the rule-based packet selection, storage, access mechanism (PSSAM) 40 includes a packet interceptor 90, a rule configuration unit 100, a rule application unit 102, an extraction unit 106, an in-kernel storage buffer 108, the an in-kernel buffer access mechanism 47.

The packet interceptor 90 intercepts the IP packets from network traffic. The intercepted packets are provided to the rule application unit 102 for further processing. The intercepted packets are also forwarded to the receiving application 50.

Configuration of Rules and Storage Buffer Sizes

The packet usage application 60 (hereinafter also referred to as the user application) includes a user interface (I/F) 62 for receiving user input 48. The user input 48 includes configuration information that is written to a configuration file 64 (also referred to herein as a set-up file). Once written to the file 64, the configuration information can be downloaded into the configuration unit 100 in kernel space. It is further noted that rules can be directly added to or deleted from the configuration unit 100 in kernel space by utilizing a command line interface.

The configuration unit 100 includes one or more rules for selecting the intercepted packets for storage and also includes the in-kernel storage buffer size, which as described in greater detail hereinafter, may be configurable by the user.

The user application 60 receives from the user interface 62 the user-space storage buffer size, which as described in greater detail hereinafter, may also be configurable by the user.

For example, an administrator can use the rule configuration unit 100 to configure one or more packet capturing rules. For example, an administrator can specify rules to capture all HTTP packets coming from a specific network interface card.

Furthermore, an administrator can utilize the rule configuration unit 100 to configure the size of the in-kernel storage buffer and the size of the user-space storage buffer. For example, an administrator can configure the in-kernel storage buffer size to 20 Megabytes and the user-space storage buffer size to 64 Kilobytes.

The rule application unit 102 applies the rules to the packets. For example, the rule application unit 102 applies one or more rules that are pre-determined and pre-configured by a user. When a packet meets or matches one or more of the rules, a copy of the packet or a portion thereof (e.g., a packet header) is selected for storage. When only a portion of the packet is needed, the packet is processed by the extraction unit 106, which extracts a pre-configured number of bytes into the in-kernel storage buffer 108. It is noted that an administrator can configure whether the whole IP packet or only a certain set number of bytes are logged or copied to the in-kernel storage buffer 108.

A first exemplary rule can specify that only certain types of packets are of interest. A header of a packet typically includes fields that specify whether the packet is an electronic mail, a Web page (HTML page), or a file transfer protocol (FTP) packet, or other type of data. Another exemplary rule can specify that only packets from a particular sender address or targeted for a particular receiver address are of interest. This rule may be applied to one or more fields in the header of the packet that specify the IP address of the sender or the recipient of the packet. As described in further detail hereinafter, a rule that selects packets based on the sender or receiver is important to a packet usage and billing application.

It is noted that a rule may be applied only to one or more IP packet header fields, only to one or more upper-level protocol header fields, or applied to one or more IP header fields in combination with one or more upper-level protocol header fields.

The extraction unit 106 is coupled to the rule application unit 102 for extracting a portion (e.g., one or more pertinent fields) from those packets that match or meet one of the rules. In some applications, only a portion of the packet may be of interest. For example, in some applications, only the TCP header and IP header of the packet may be of interest. In other applications, only a portion of the application data may be of interest. For example, a rule can be applied to extract one or more bytes of data from the packet (e.g., header and a portion of the application data) that are useful to the metering application. For example, application data may contain a mobile phone number for use by wireless carriers to track the Internet usage of a mobile phone user.

For example, in a packet metering application, the headers that contain information needed by the accounting/billing applications are extracted from the IP packets. The extracted information is then stored in the in-kernel storage buffer 108.

The in-kernel storage buffer 108 is provided with an access mechanism 47 for use by the user application to read information from the in-kernel storage buffer 108.

Processing Steps Performed by PSSAM 40

Figure 4:
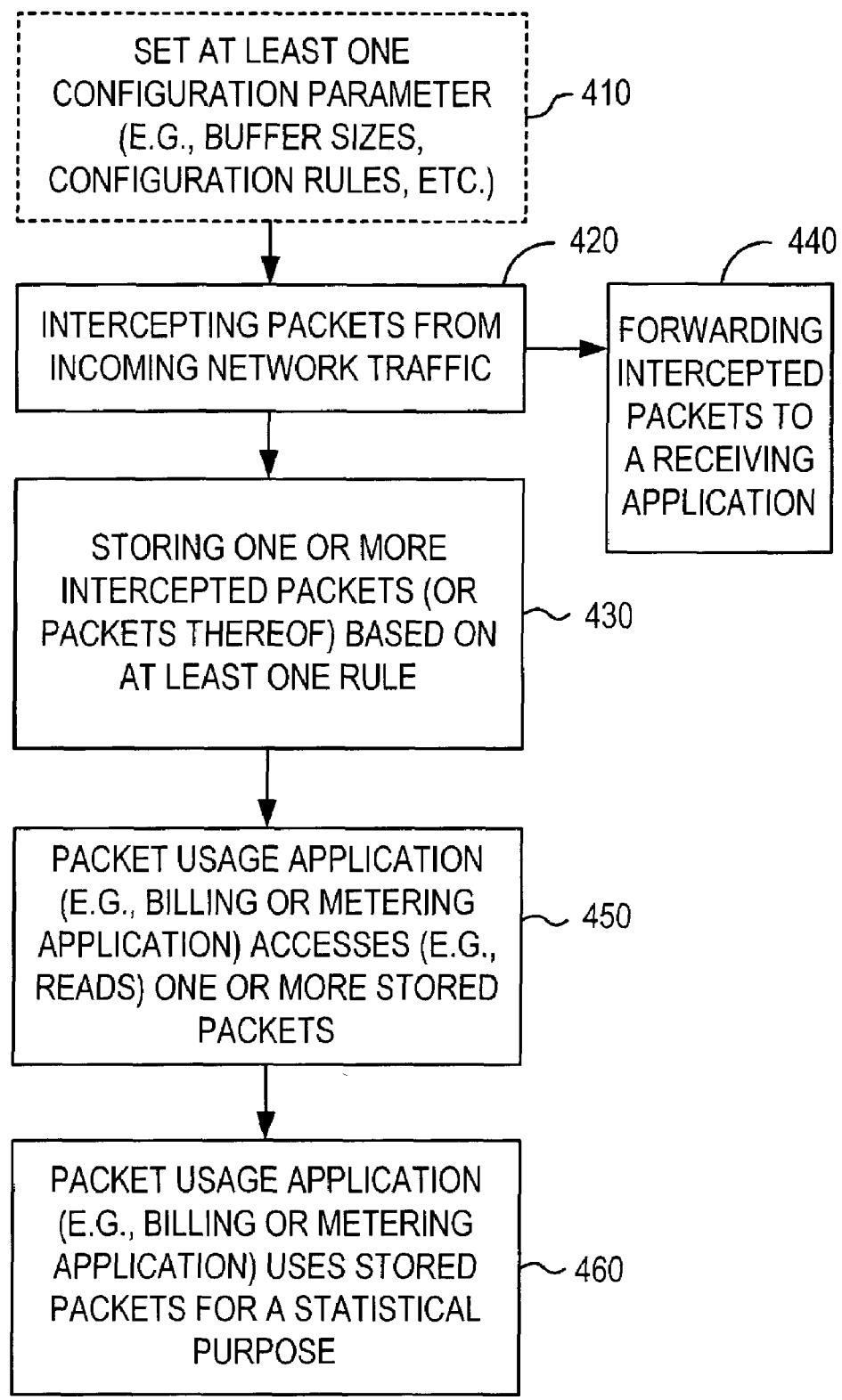
FIG. 4 is a flow chart illustrating the steps performed by the rule-based packet selection, storage, access mechanism (PSSAM) in accordance with one embodiment of the present invention.

FIG. 4 is a flow chart illustrating the steps performed by the rule-based packet selection, storage, access mechanism (PSSAM) 40 in accordance with one embodiment of the present invention. In step 410, a user performs a configuration step. This step can include defining one or more rules (e.g., a set of rules) for selecting packets of interest, configuring the size of the in-kernel storage buffer, and the configuring the size of the user space buffer. In step 420, IP packets are intercepted from the incoming network. In one embodiment, copies are made of the intercepted packets. A first set of copies of the intercepted packets is processed in processing step 440, and the other set of copies of the intercepted packets are processed in processing step 430. In step 430, the intercepted packets that meet the rules are selected and stored in an in-kernel storage buffer. Alternatively, only a portion of each packet (e.g., header information or header information in combination with a leading portion of the application data) may be stored instead of the entire packet. In step 440, the intercepted packets are forwarded to a receiving application.

In step 450, a metering application reads one or more stored packets from the in-kernel storage buffer. In step 460, the metering application uses the retrieved packets for a statistical purpose (e.g., measuring usage of the network in terms of number of packets sent and received by a specific network (IP) address).

According to one embodiment of the invention, the following steps are performed.

1. Perform Configuration of Rules and Storage Buffer Sizes.

2. IP Meter kernel module intercepts IP packets from incoming network traffic. Optionally, the IP Meter kernel module can extract a portion of the packet (e.g., headers and a predetermined number of bytes of the application data that is needed by the usage metering applications from IP packets).

3. IP Meter logs headers to the in-kernel memory buffer (e.g., a 20 Megabyte in-kernel storage buffer).

4. User application opens the IP Meter pseudo driver and issues an IP Meter_read( ) call. The IP Meter_read( ) issues a read( ) system call with configured user-space storage buffer size (e.g., 64 Kilobytes).

5. IP Meter pseudo driver retrieves a user-configured size of headers (e.g., 64 Kilobytes) from the in-kernel memory buffer and pushes all retrieved headers to IP Meter user code. It is noted that the in-kernel memory buffer may contain multiple IP packets.

6. IP Meter user code returns one header at a time to the user application and caches the rest of the unread headers in the user-space storage buffer (hereinafter referred to also as a user-space cache). The subsequent IP Meter_read( ) retrieves headers from user buffer cache without the need to invoke read( ) system call. This IP Meter header push/cache mechanism reduces the user application and kernel interactions, thereby optimizing the performance of header retrieval from user program.

Configuration Processing

Figure 5:
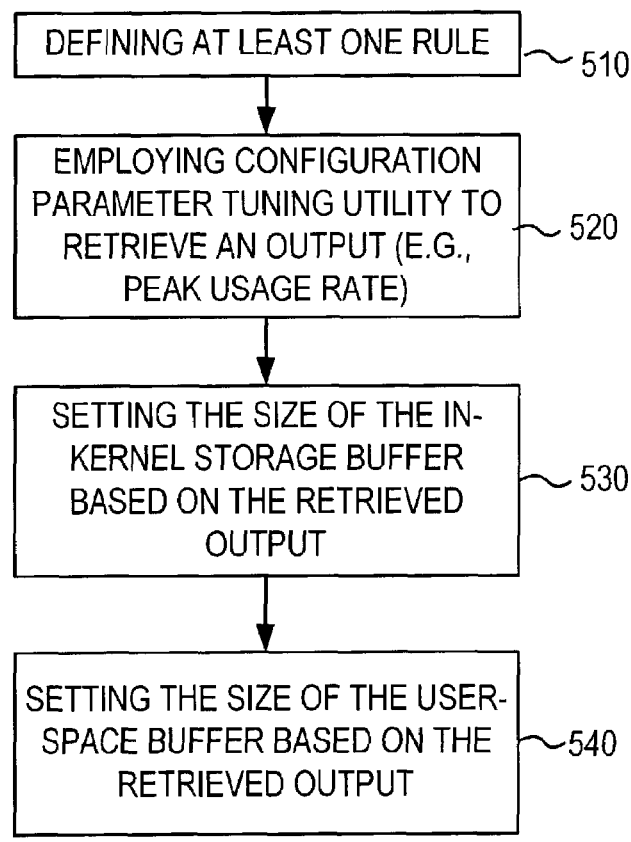
FIG. 5 is a flow chart illustrating in greater detail the configuration step (step 410) of FIG. 4 in accordance with one embodiment of the present invention.

FIG. 5 is a flow chart illustrating in greater detail the configuration step (step 410) of FIG. 4 in accordance with one embodiment of the present invention. The configuration step 410 can include the following sub-steps. In step 510, the user defines one or more selection rules. A rule can be any selection criteria that utilize data in one or more bytes in the intercepted packet to determine whether to store the packet or a portion thereof. For example, in the packet usage/billing application, it is determined that the application only needs the header information. In this case, 128 bytes of the IP header are extracted by the information extraction unit and stored in the in-kernel memory. In this manner, the in-kernel memory is not filled with information that is not useful to the application.

TABLE I-III illustrates exemplary packet capturng rules.

| IP HEADER | TCP HEADER | APPLICATION DATA |
|---|---|---|
| (ver) 4 | (src port) 2002 | 220 hp.com SendMail |
| ... | (dst port) 25 | 4.1/ ... |
| (src) 15.13.104.33 | (seq no) 434329 | |
| (dst) 207.46.230.220 | (ack no) 898902 | |
| ... | (tcp flags) SYN | |

Rule 1:
  PASS IN LOG BODY BYTES 128 FROM ANY TO ANY PROTO TCP USING

Port 25

Effect:
  Log the header and first 128 bytes of the network packet from any incoming packet destined to any IP addresses whose upper level protocol is TCP and is destined to TCP PORT 25. TCP PORT 25 is typically the SMTP incoming port.

TABLE I

| IP HEADER | TCP HEADER | HTTP HEADER | APPLICATION DATA |
|---|---|---|---|
| (ver) 4 | (src port) 2003 | Getms.com | (123)-456-7890 |
| ... | (dst port) 80 | HTTP/1.1 | |
| (src) 15.13.104.33 | (seqno) 434440 | | |
| (dst) 207.46.230.220 | (ackno) 892343 | | |
| ... | (tcp flags) | | |

Rule 2:
  PASS IN LOG FROM ANY TO 207.46.230.220 PROTO TCP USING PORT 80

Effect:
  Log the header from any incoming packet destined to IP address 207.46.230.220 whose upper level protocol is TCP and is destined to TCP PORT 80. (PORT 80 is often the HTTP incoming port).

TABLE II

| IP HEADER | TCP HEADER | HTTP HEADER | APPLICATION DATA |
|---|---|---|---|
| (ver) 4 | (srcport) 2004 | HTTP rev | ... |
| ... | (dst port) 80 | 1.1 | |
| (src) 15.13.104.33 | (seqno) 654321 | | |
| (dst) 207.46.230.220 | (ackno) 123456 | | |
| ... | (tcp flags) | | |

Rules 3 and 4:
  PASS IN LOG FROM 15.13.104.33 TO ANY PROTO TCP USING PORT 80
  PASS OUT LOG FROM ANY PROTO TCP USING PORT 80 TO 15.13.104.33

Effect:
  Log the header of incoming and outgoing TCP/IP packets from/to IP address 15.13.104.33 that are HTTP traffic.

In step 520, the configuration parameter tuning utility (CPTU) 41 is employed to retrieve an output of the storage parameter provider 52. The output can be, for example, the peak usage rate of the in-kernel storage buffer.

In steps 530 and 540, one or more configuration parameters are set or adjusted based on the output. For example, in step 530 an administrator can utilize the output (e.g., peak usage rate of the in-kernel storage buffer) of the storage parameter provider 52 to set the in-kernel storage buffer size. In one example, the in-kernel buffer size is set to be 20 Megabytes.

In step 540, an administrator can utilize the output (e.g., peak usage rate of the in-kernel storage buffer) of the storage parameter provider 52 to set the user-space storage buffer size. In one example, the user-space storage buffer size is set to be 64 Kilobytes. It is noted that the size of the in-kernel buffer size and the user-space buffer size may be tailored to suit the requirements of a particular application.

Access Processing

Figure 6:
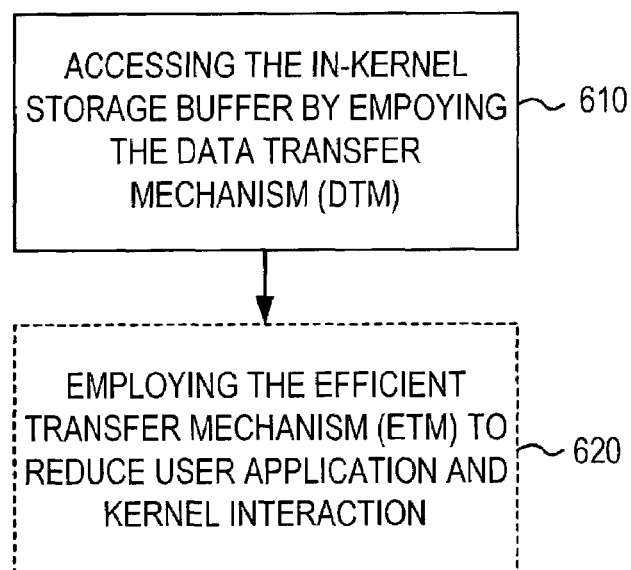
FIG. 6 is a flow chart illustrating in greater detail the access step (step 450) of FIG. 4 in accordance with one embodiment of the present invention.

FIG. 6 is a flow chart illustrating in greater detail the access step (step 450) of FIG. 4 in accordance with one embodiment of the present invention. In step 610, the user application 60 employs the data transfer mechanism (DTM) 47 to access the in-kernel storage buffer 108. In step 620, optionally an efficient transfer mechanism (ETM) is utilized to transfer data in a particular manner from the kernel space to the user space so that the interaction between the user application and the kernel space is reduced.

In one embodiment, the efficient transfer mechanism (ETM) in response to an access command (e.g., a read packet command) from the packet usage application 60 reads a predetermined amount of data (e.g., the size of the user-space storage buffer 84 or current remaining space left in the buffer 84) from the in-kernel storage buffer 108. Once the information is transferred to the user-space storage buffer 84, the packet usage application 60 (e.g., a billing application) can retrieve the information directly from user-space storage buffer 84 one packet at a time (e.g., a byte at a time). Subsequent access commands (e.g., a read packet command) from the packet usage application 60 may retrieve data directly from the user-space buffer 84 until the user-space buffer 84 is empty at which time an access to the in-kernel storage buffer 108 is initiated. It is noted that an access to the in-kernel buffer 108 may be initiated before the buffer 84 is empty (e.g., when the user-space buffer 84 is a predetermined percentage empty or full). The user-space storage buffer 84 acts as a cache or temporary storage of information retrieved from the in-kernel storage buffer 108. In this manner, the number of accesses to the kernel buffer 108 is reduced. The processing steps performed by the ETM are described in greater detail hereinafter with reference to FIGS. 9 and 10.

Data Transfer Mechanism 47

Figure 7:
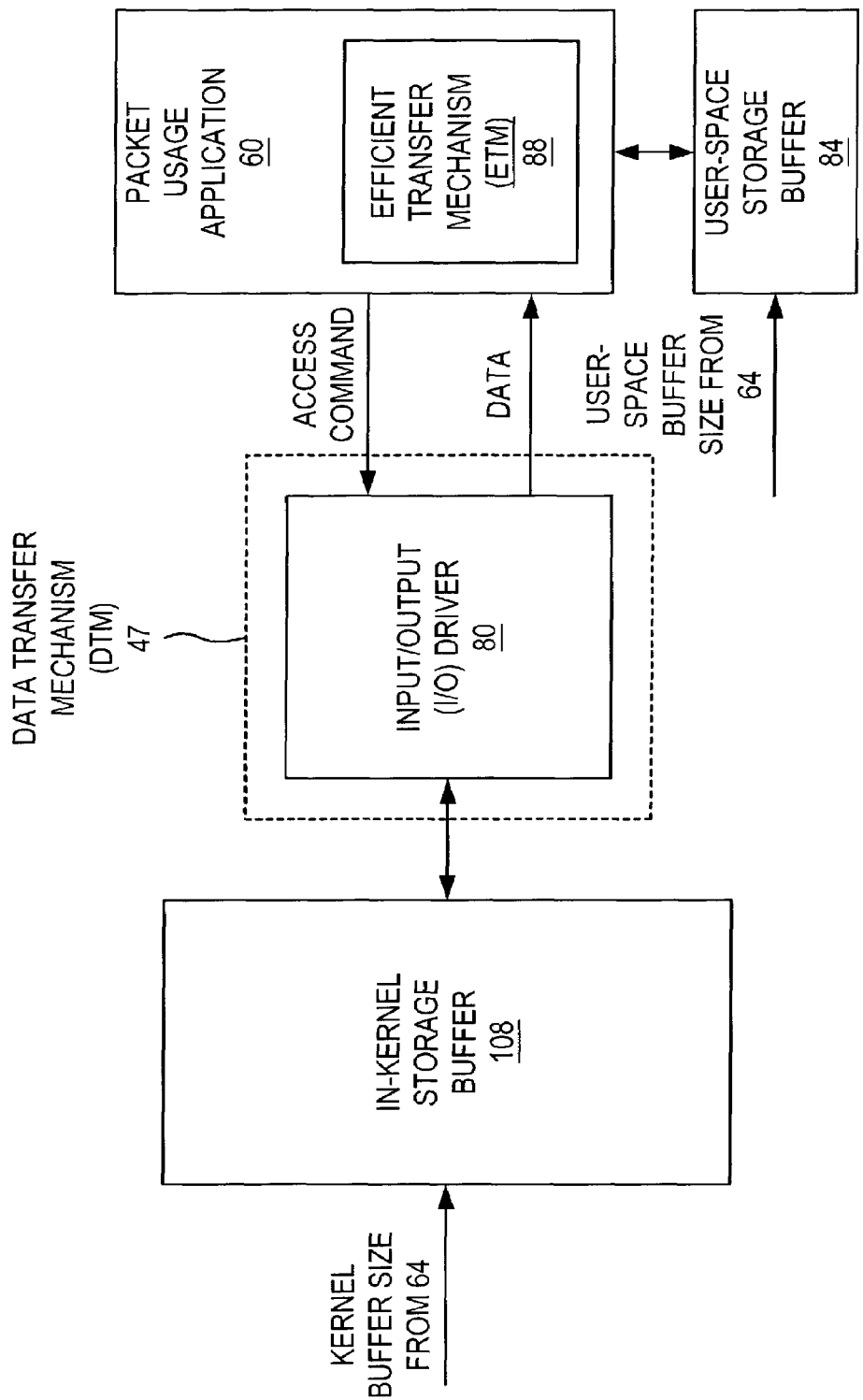
FIG. 7 illustrates in greater detail the data transfer mechanism of FIG. 1 that provides access to the in-kernel buffer in accordance with one embodiment of the present invention.

FIG. 7 illustrates in greater detail the data transfer mechanism 47 of FIG. 1 in accordance with one embodiment of the present invention. The data transfer mechanism (DTM) 47 provides access to the in-kernel buffer to packet usage applications 60. The data transfer mechanism (DTM) 47 includes an input/output (I/O) driver 80 for use by applications (e.g., the packet usage application 60) to access the in-kernel storage buffer 108. The I/O driver 80 provides an interface to the in-kernel storage buffer 108 for applications, such as packet usage application 60, to read information from the in-kernel storage buffer 108.

For example, the packet usage application 60 can use standard system calls, such as the open( ) syscall and the read( ) syscall to transfer information stored in the in-kernel storage buffer 108 from the buffer 108 to the packet usage application 60. The IP Meter user code can then retrieve one packet or a portion of the packet for the billing application. The remaining packets in the IP Meter buffer are stored in a separate buffer (e.g., a user space buffer 84) for subsequent use by the packet usage application 60.

In one embodiment, the I/O driver 80 provides access to the in-kernel storage buffer 108 with standard I/O system calls. The in-kernel storage buffer 108 is treated as a standard I/O device. In this manner, the in-kernel storage buffer 108 can be read by utilizing standard I/O system calls. These commands can include, for example, open, read, write, etc. The use of standard I/O commands obviates the need to define a new system call or a new programming interface (API), thereby simplifying the implementation effort of the mechanisms according to the invention.

The packet usage application 60 can optionally include an efficient transfer mechanism (ETM) 88 for efficiently transferring data in a predetermined manner from the kernel space 44 to the user space 45 so that the interaction between the user application 60 and the kernel space 44 is reduced. The steps performed by the efficient transfer mechanism (ETM) 88 are described in greater detail hereinafter with reference to FIG. 10.

Figure 8:
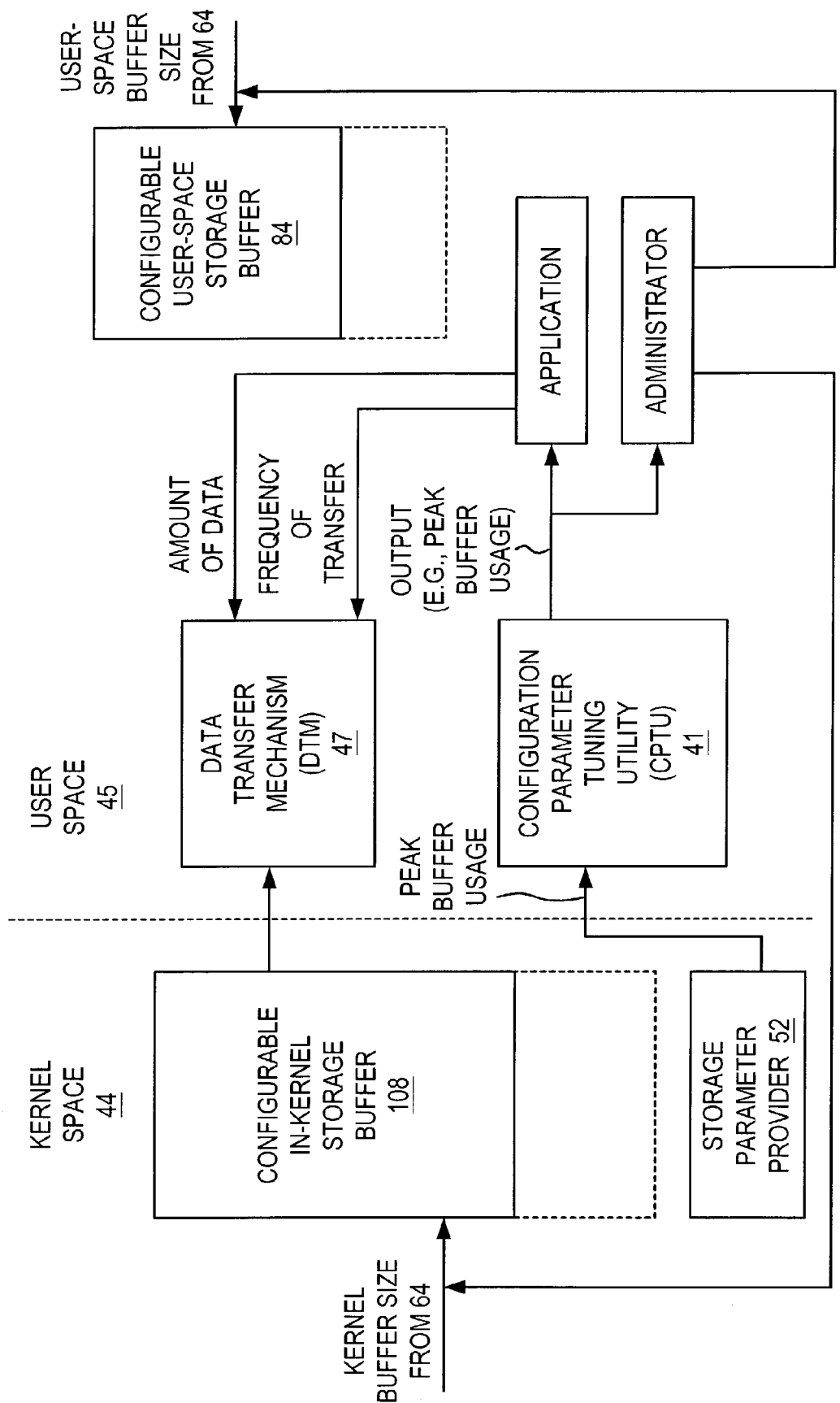
FIG. 8 illustrates a data transfer mechanism, a configurable in-kernel storage buffer, a configurable user-space storage buffer, and a configuration parameter tuning utility in accordance with one embodiment of the present invention.

FIG. 8 illustrates the data transfer mechanism (DTM) 47, a configurable in-kernel storage buffer 108, a configurable user-space storage buffer 84, and a configuration parameter tuning utility (CPTU) 41 in accordance with one embodiment of the present invention. The configurable in-kernel storage buffer 108 has a configurable size denoted kernel_buffer_size that may be specified in the configuration file 64. The configurable user-space storage buffer 84 has a configurable size denoted user_buffer_size that may also be specified in the configuration file 64.

Configuration Parameter Tuning Utility (CPTU) 41

Another aspect of the invention is the provision of configurable parameters and tuning tools for administrators to tailor a solution to meet the requirements of an operating environment (e.g., a network environment).

As described previously, one novel aspect of the invention is the configurability of the size of the in-kernel buffer. By making the size of the in-kernel buffer configurable, a user can modify the size of the buffer to prevent packet loss and at the same time minimize the system resources needed by the system for measuring the usage of the network (e.g., packet metering). The configuration parameter tuning utility (CPTU) 41 according to the invention is provided to assist a customer (e.g., an ISP administrator) or application in adjusting one or more of the configuration parameters. The configuration parameters include, but are not limited to, the size of the in-kernel storage buffer, the size of the user-space storage buffer, the amount of data to be transferred from the in-kernel storage buffer to the user-space storage buffer in a single access, and the frequency of the data transfers between the in-kernel storage buffer and the user-space storage buffer.

A customer or user knows the peak traffic usage for its network. The storage parameter provider 52 provides an output (e.g., statistical information about the in-kernel buffer that corresponds to the peak network traffic load). The CPTU 41 provides an interface for a user to access the output of the storage parameter provider 52. The statistical information can be the peak in-kernel buffer usage (i.e., the greatest amount of space utilized in by the in-kernel buffer when the network is subject to peak network traffic). By having access to this statistical information, which may be obtained in a test environment with a maximum anticipated network traffic load), an administrator (e.g., a user) can adjust or tune one or more of the configuration parameters (e.g., the size of the in-kernel buffer and the size of the user-space buffer).

This output of the CPTU 41 may be provided to a system administrator, who can re-configure the in-kernel buffer 108 to a larger size, thereby preventing the loss of packets. Alternatively, the output of the CPTU 41 (e.g., the peak buffer usage information) may be provided to an application so that 1) the user application can move data from the in-kernel buffer 108 to the user space buffer 84 in a more frequent manner (e.g., move the same amount of data more often), 2) move more data from the in-kernel buffer 108 to the user space buffer 84 at the same frequency, or 3) move more data from the in-kernel buffer 108 to the user space buffer 84 in a more frequent manner.

In one embodiment, the configuration parameter tuning utility (CPTU) 41 provides statistical information that helps customer to configure the size of the in-kernel storage buffer 108 to accommodate peak networking traffic load. The statistical information can be the maximum in-kernel buffer size utilized for a particular network load. In this manner, a customer (e.g., an ISP) can determine a size of the in-kernel storage buffer 108 so as to prevent packet loss and yet minimize the burden to the system.

For example, an IP Meter administrator can monitor the maximum usage of kernel buffer and determine the peak usage memory requirements of the IP Meter system. The IP Meter administrator can then allocate the amount of memory necessary to buffer packets being read from the network versus the speed of the user space billing program use of IP Meter to process the packets for billing so that there is no packet loss.

Efficient Transfer Mechanism

Figure 9:
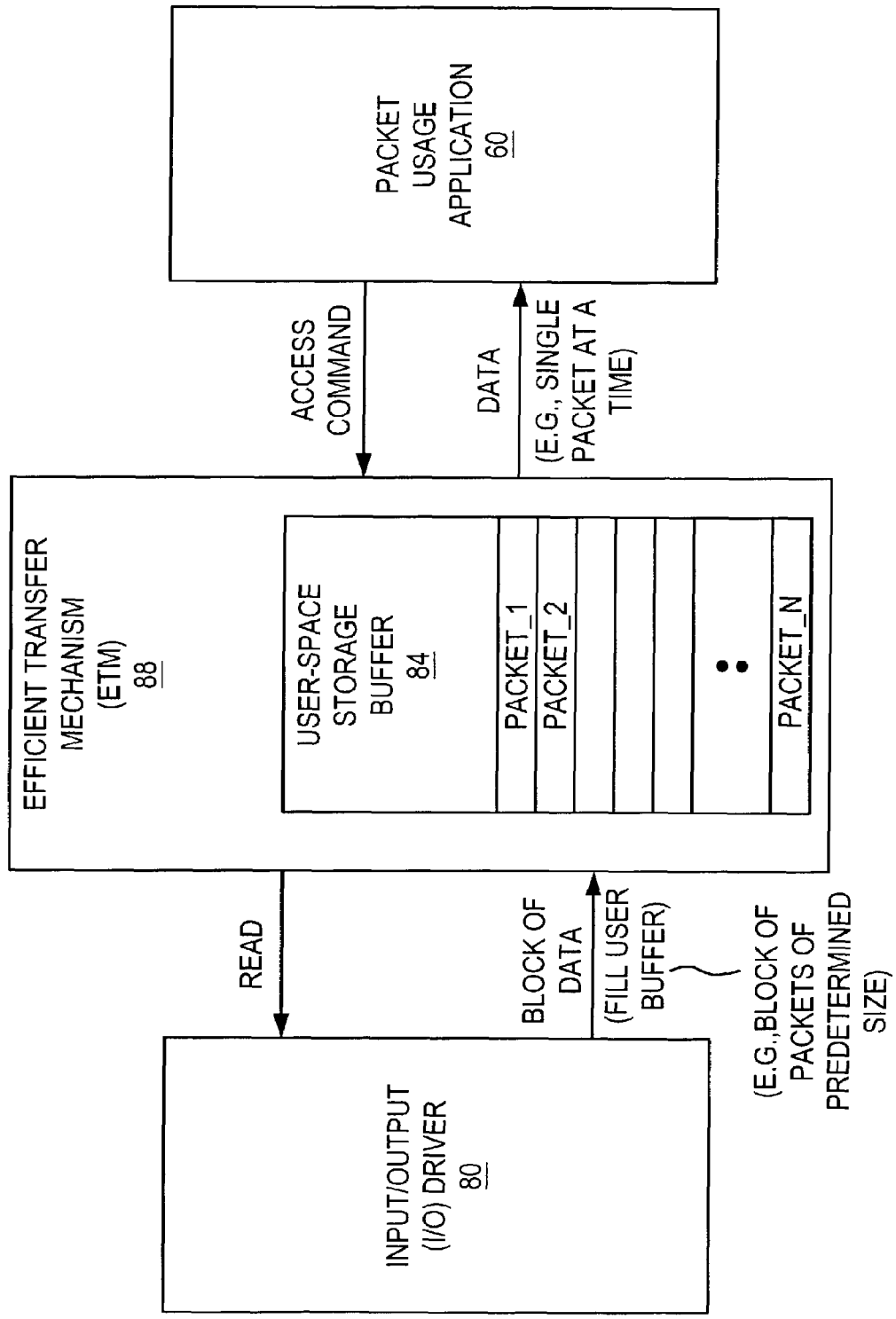
FIG. 9 illustrates an efficient and configurable transfer mechanism in accordance with one embodiment of the present invention.

FIG. 9 illustrates an efficient and configurable transfer mechanism (ETM) 88. One aspect of the invention is the provision of a mechanism 88 for use by an application to access the stored packets. The efficient transfer mechanism 88 according to the invention accesses (e.g., reads) a configurable amount of data (e.g., a predetermined number of packets from the in-kernel storage buffer in single access operation, and then allows an application (e.g., a billing application) to access the retrieved information (e.g., packets) one at a time.

This efficient and configurable transfer mechanism 88 provides a low overhead mechanism to push as much information from the in-kernel storage buffer 108 to the user-space storage buffer 84 for each read access to the in-kernel storage buffer 108, thereby reducing the number of accesses to the kernel space 44. In one embodiment, the ETM 88 is implemented as user code in the user application 60 for efficiently retrieving headers from the in-kernel storage buffer 108 through the DTM 47.

Efficient Transfer Processing

Figure 10:
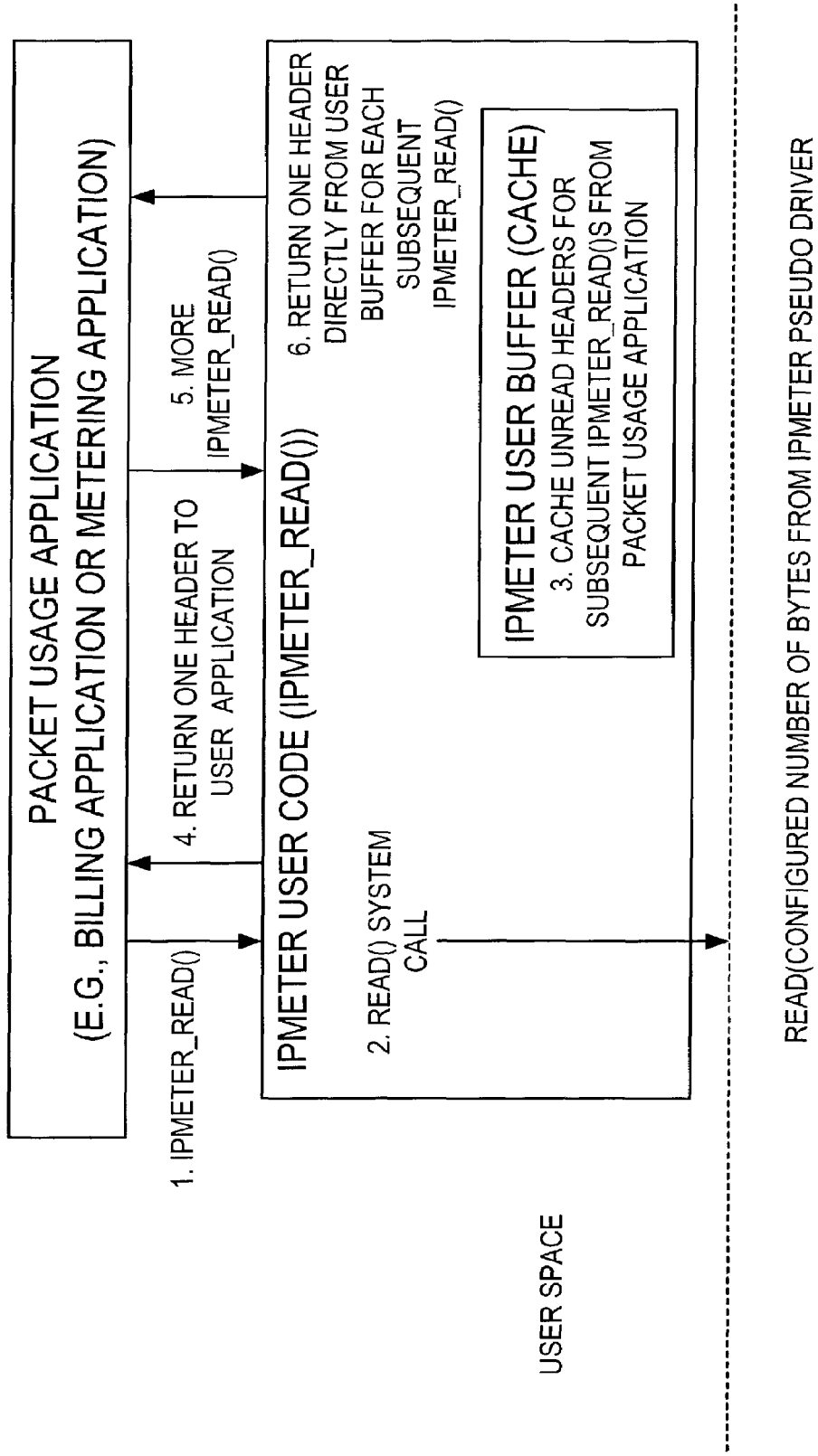
FIG. 10 is a flowchart illustrating the steps performed by the efficient transfer mechanism in accordance with one embodiment of the present invention.

FIG. 10 is a flowchart illustrating the steps performed by the efficient transfer mechanism (ETM) in accordance with one embodiment of the present invention. In step 1010, the user application issues an IPMeter_read( ) command. In step 1020, the IP Meter user code issues a Read( ) system call that reads a configured number of bytes from the IP Meter pseudo driver. The IP Meter user code caches the unread headers for subsequent IPMeter_read( ) operations from the user application. In step 1030, the IP Meter user code returns a single header to the user application. In step 1040, the user application generates more IPMeter_read( ) commands. The IP Meter user code returns the headers directly from the user space storage buffer. In this manner, the header push/cache mechanism reduces the interactions between the user application and the kernel, thereby increasing the performance of the data retrieval from the in-kernel storage buffer.

The IP Meter user code utilizes I/O system calls (e.g., a read system call) to access information (e.g., stored packets) from the in-kernel storage buffer 108 (e.g., a buffer in the kernel space). The IP Meter kernel code receives the read system call and employs an efficient transfer mechanism (ETM) 88 for automatically pushing as much information (e.g., as much information as can be stored in the user-space buffer 84) from the in-kernel storage buffer 108 into the user-space storage buffer 84.

Preferably, the kernel modules of the invention are implemented as dynamically loadable modules (i.e., as modules that can be installed and updated without having to re-boot the system).

Implementation Utilizing Firewall Product

One implementation of the IP Meter in accordance with the invention is to leverage a logging capability of a firewall product to capture packets for IP usage metering. The conventional use of a firewall is to log suspicious packets (e.g., packets that fail predetermined filtering rules or security policies). These logged packets are stored in a log file for subsequent analysis by an administrator.

In one implementation, the IP Meter can leverage the logging capability of a firewall product by setting the rules to log IP packets in a manner that allows a user (e.g., system administrator) to determine network usage between specific IP addresses and network services such as Internet Web Pages or electronic mail (e-mail) activity. The IP Meter then optimizes and uses this logged information for IP packet usage metering. This novel use of firewall software logging capability can significantly shorten and ease (e.g., by the saving of engineering effort) the IP Meter implementation effort.

The selection, storage, access mechanisms according to the invention have several advantages.

High Precision IP Packet Usage Metering

The PSSAM according to the invention precisely captures all IP packets with no packet loss even under heavy traffic load. When employed by a billing application, the usage and billing can be very accurate.

Cost Effective

The PSSAM according to the invention may be implemented as a self-contained software module in the server system. There is no need for extra hardware installation that is required for hardware-based solution. In this manner, the PSSAM according to the invention is more cost effective than the hardware solutions.

Reliable and Low Performance Overhead

The PSSAM according to the invention reduces the data copy and interaction between the user application and operating system kernel, thereby improving performance and enabling zero-packet loss.

The principles of the present invention are described in the context of a method and system for selecting IP packets, storing portions of the selected packets, and providing an interface. However, it is noted that the teachings of the present invention can be applied to other information (e.g., non-network data), to network information that are organized with other protocols or models (e.g., non-TCP/IP model information) and to other types of data (e.g., non-packet data or information).

Similarly, although the principles of the present invention are described in the context of a pay-per-use packet metering and billing application, it is noted that the selected packets or portions thereof may be utilized for numerous other types of applications (e.g., an application to analyze network traffic, an application to record the usage of specific HTTP or SMTP servers, an application to bill users for web pages requested by the user while not billing the users for advertisement web pages sent to the user's IP address).

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method of billing for transfers of data in a network, wherein said data comprises packets, said method comprising:

copying at least a portion of a packet based on at least one rule;

storing said at least a portion of the copied packet in an in-kernel buffer, wherein the size of said in-kernel buffer is changeable, said in-kernel buffer having a first priority;

transferring said at least a portion of said copied packet from said in-kernel buffer to a user buffer, said user buffer having a second priority wherein said first priority is more secure than said second priority; and processing said at least a portion of said copied packet by a billing program, wherein billing is based on the number of copied packets.

2. The method of claim 1 and further comprising changing the size of said in-kernel buffer based on a statistical analysis.

3. The method of claim 2, wherein said statistical analysis is based at least in part on the anticipated maximum network traffic load.

4. The method of claim 2, wherein said statistical analysis is based at least in part on the usage of said in-kernel buffer when the network traffic is at a preselected level.

5. The method of claim 1, wherein the size of said user buffer is changeable.

6. The method of claim 1, and further comprising adjusting the size of said user buffer.

7. The method of claim 1 and further comprising changing the size of said user buffer based on the number of packets copied over a period.

8. The method of claim 1, wherein said transferring said at least a portion of said copied packet from said in-kernel buffer to a user buffer comprises transferring a plurality of portions of packets one at a time.

9. The method of claim 1, wherein said copying at least a portion of a packet is based on at least one rule that compares one of a source address and a destination address of a packet with a corresponding predetermined source address and destination address.

10. The method of claim 1, wherein said copying at least a portion of a packet is based on at least one rule that compares a port number associated with a packet to a predetermined port number.

11. The method of claim 1 wherein said at least a portion of said packet is stored based on at least one rule.

12. The method of claim 11, wherein said at least a portion of said packet is stored based on a rule that compares one of a source address and a destination address of a packet with a corresponding predetermined source address and destination address.

13. The method of claim 12, wherein said at least a portion of said packet is stored based on a rule that compares a port number associated with a packet to a predetermined port number.

14. The method of claim 1, wherein said at least one rule comprises determining a network card associated with the transfer of said packet.

15. The method of claim 1, wherein said at least one rule comprises determining a port associated with the transfer of said packet.

16. A method of billing for data transfers within a network, wherein said data comprises packets, said method comprising:

copying at least a portion of a packet transferred within said network;

storing at least a portion of said packet in an in-kernel buffer if said packet meets at least on rule, wherein the size of said in-kernel buffer is changeable, said in-kernel buffer has a first priority associated therewith;

transferring said at least a portion of the stored packet from said in-kernel buffer to a user buffer, said user buffer having a second priority wherein said first priority is more secure than said second priority; and processing said at least a portion of said copied packet by a billing program, wherein billing is based on the number of stored packets.

17. The method of claim 16 and further comprising:
monitoring the usage of said in-kernel buffer; and
configuring the size of said in-kernel buffer based on said usage.

18. The method of claim 16 and further comprising:
monitoring the usage of said user buffer; and
configuring the size of said user buffer based on said usage.

19. The method of claim 16, wherein said copying comprises copying said packets, wherein one copy is transferred to a destination location.

20. The method of claim 16, wherein said copying a packet is based on at least one rule.

21. The method of claim 20, wherein said at least one rule compares one of a source address and a destination address of a packet with a corresponding predetermined source address and destination address.

22. The method of claim 20, wherein said at least one rule compares a port number associated with a packet to a predetermined port number.

23. The method of claim 16, wherein said at least one rule compares one of a source address and a destination address of a packet with a corresponding predetermined source address and destination address.

24. The method of claim 16, wherein the size of said in-kernel buffer is changed based on a statistical analysis.

25. The method of claim 24, wherein said statistical analysis is based at least in part on the usage of said in-kernel buffer when the network traffic is at a preselected level.

26. A system of billing for data transfers in a network, the system comprising a computer readable medium having computer code stored therein, said computer code comprising instructions for:

copying at least one portion of a packet being transferred within said network based on at least one rule;

storing said at least one portion of said packet in an in-kernel storage buffer, said in-kernel storage buffer having a first priority;

transferring said at least one portions of said packet to a user buffer, said user buffer having a second priority, said first priority being greater than said second priority; and processing said at least a portion of said copied packet by a billing program, wherein billing is based on the number of stored packets.

27. The system of claim 26, wherein said instruction further comprise:
monitoring network traffic; and
adjusting the size of said in-kernel storage buffer based on said network traffic.

28. The system of claim 26, wherein said instruction further comprise:
monitoring network traffic; and
adjusting the size of said user buffer based on said network traffic.

* * * * *